United States Patent
Leone

(10) Patent No.: US 7,771,587 B2
(45) Date of Patent: Aug. 10, 2010

(54) METHOD FOR REMOVING NITROGEN COMPOUNDS FROM GASOLINE OR DIESEL FUEL USING MOLECULARLY IMPRINTED POLYMERS

(76) Inventor: Anna Madeleine Leone, P.O. Box 8626, Emeryville, CA (US) 94662

( * ) Notice: Subject to any disclaimer, the term of this patent is extended or adjusted under 35 U.S.C. 154(b) by 132 days.

(21) Appl. No.: 12/283,651

(22) Filed: Sep. 12, 2008

(65) Prior Publication Data
US 2009/0014357 A1 Jan. 15, 2009

Related U.S. Application Data

(63) Continuation-in-part of application No. 11/412,586, filed on Apr. 27, 2006, now Pat. No. 7,438,798.

(51) Int. Cl.
*C07C 7/12* (2006.01)
(52) U.S. Cl. .................................. 208/254 R; 585/820
(58) Field of Classification Search .............. 208/254 R
See application file for complete search history.

(56) References Cited

U.S. PATENT DOCUMENTS 6,660,176 B2 * 12/2003 Tepper et al. .................. 216/56
7,232,516 B2 * 6/2007 Sughure et al. ............. 208/306
7,309,416 B2 * 12/2007 Fokema et al. .............. 208/243

* cited by examiner

Primary Examiner—Tam M Nguyen
(74) Attorney, Agent, or Firm—Risto A. Rinne, Jr.

(57) ABSTRACT

A method and product for removing nitrogen compound molecules from gasoline or diesel fuel includes exposing the gasoline or diesel fuel to a plurality of molecularly imprinted polymer beads (MIPS) that have receptor sites on the surfaces thereof that include imprints that match the physical shape of at least a portion of a nitrogen compound molecule. A quantity of the nitrogen molecules align with and adhere to some of the receptor sites and, accordingly, they are removed from the gasoline or diesel fuel producing a remediated or sweetened gasoline or diesel fuel. According to one embodiment, the MIPS are contained in an enclosure having a plurality of openings large enough to permit the solution to pass through and small enough so as to prevent the MIPS from passing through. According to another embodiment the MIPS are applied (i.e., coated) to the inside surface of a conduit and the gasoline or diesel fuel is forced or allowed to flow through the conduit thereby removing some of the nitrogen molecules therefrom. The MIPS are treated after use to remove a sufficient quantity of the nitrogen molecules from the receptor sites and are reused.

20 Claims, 2 Drawing Sheets

METHOD FOR REMOVING NITROGEN COMPOUNDS FROM GASOLINE OR DIESEL FUEL USING MOLECULARLY IMPRINTED POLYMERS

This patent application is a Continuation-In-Part of currently U.S. patent application Ser. No. 11/412,586, that was filed on Apr. 27th, 2006, now U.S. Pat. No. 7,438,798 entitled "Method For Removing Sulfur Compounds from Gasoline or Diesel Fuel Using Molecularly Imprinted Polymers", by the same inventor, Anna Madeleine Leone, and which is presently approved for issuance as a patent, and wherein this currently filed Continuation-In-Part patent application claims the benefit of the date of priority of the above-identified patent application.

BACKGROUND OF THE INVENTION

1. Field of the Invention

The present invention, in general, relates to removing specific compounds from gasoline or diesel fuel and, more particularly, to a method and product for removing nitrogen compounds from gasoline or diesel fuel by exposure of the gasoline or diesel fuel to a molecularly imprinted polymer.

Nitrogen compounds in gasoline or diesel fuel, when burned such as by the combustion of gasoline or diesel fuel in internal combustion engines; produce nitric oxide (NO) and nitrogen dioxide ($NO_2$), primarily, which contributes in part to the formation of smog and which has adverse affects upon the atmosphere. Numerous well-known environmental impacts are caused by the release primarily of nitric oxide and nitric dioxide, and by the release of other byproducts that result from the combustion of molecules that contain nitrogen.

Therefore, the goal is to reduce the amount of nitrogen compounds in gasoline or diesel fuel before the gasoline or diesel fuel is burned (combusted) which will, in turn, reduce the amount of nitrogen oxides, primarily nitric oxide and nitrogen dioxide, that are being emitted out of the exhaust pipes of the respective vehicles.

Accordingly, it is expected that the government will begin to regulate nitric oxide and nitrogen dioxide emissions from gasoline and diesel fuel, and that the intent of such possible regulations will be to lower the level of these emissions into the atmosphere. In order to decrease such emissions, it is necessary to reduce the nitrogen compounds that are present in the gasoline or diesel fuel before it is used (i.e., combusted or burned) in internal combustion types of gasoline or diesel engines.

Accordingly, refineries are seeking to find new technologies that can reduce the number and type of nitrogen compounds in gasoline or diesel fuel prior to the use of the gasoline or diesel fuel in vehicles.

However, there are many difficulties that have thus far prevented an effective solution from being found. For example, all current approaches are expensive. The possibility of substantially raising the cost of a gallon of gasoline or diesel fuel is not likely to be well-received by the general public, especially in light of the currently high prices for these fuels and the generally difficult current economic times.

Furthermore, a potential problem relating to removing nitrogen compounds from gasoline or diesel fuel includes the potential of also removing some or even a significant amount of the hydrocarbon content of the fuel, thereby resulting in a lower octane rating and yielding a gasoline or diesel fuel that has lower value, or worse yet, may not be suitable for use in certain situations.

As certain vehicles require a higher octane fuel in order to run properly, an effective way by which refineries can provide reasonably priced, higher octane rated gasoline and diesel fuel with a low nitrogen content is, at present, unknown.

The problem is further compounded by the fact that all crude oil is not the same. Gasoline that is produced (i.e., refined) from Saudi Arabia crude oil may have a different mix of nitrogen compounds that crude oil that is produced from South African crude oil, for example.

For a solution to this problem to be especially viable, it must economically remove a variety of nitrogen compounds from gasoline or diesel fuel without also excessively reducing the hydrocarbon content of the gasoline or diesel fuel. In other words, it must be specific as to what compounds are removed from the gasoline, extracting the target nitrogen compounds while leaving (i.e., not removing) the other various hydrocarbon compounds that contribute to the energy content of the gasoline or diesel fuel.

Certain of the more common and deleterious nitrogen compounds include pyrrole (PY), indole (IL) and carbazole (CB). The abbreviations, as shown in parentheses will be used hereinafter.

Accordingly, there exists today a need for a method and product for removing nitrogen compounds from gasoline or diesel fuel in ways that help ameliorate the above-mentioned difficulties.

Clearly, such a method and product would be especially useful and desirable.

2. Description of Prior Art

Processes for removing compounds from non-aqueous solutions are known.

While the structural arrangements of the above described methods, at first appearance, may have similarities with the present invention, they differ in material respects. These differences, which will be described in more detail hereinafter, are essential for the effective use of the invention and which admit of the advantages that are not available with the prior methods.

OBJECTS AND SUMMARY OF THE INVENTION

It is an object of the present invention to provide a method for removing nitrogen compounds from gasoline or diesel fuel by exposing the gasoline or diesel fuel to a molecularly imprinted polymer having an imprint on a surface thereof that corresponds to at least a portion of the shape of a target nitrogen compound molecule.

It is also an important object of the invention to provide a method for removing nitrogen compounds from gasoline or diesel fuel using molecularly imprinted polymers that is economical to use.

Still another object of the invention is to provide a method for removing nitrogen compounds from gasoline or diesel fuel using molecularly imprinted polymers that is highly selective in removing the target molecule while leaving unaffected other molecules.

Yet another important object of the invention is to provide a method for removing nitrogen compounds from gasoline or diesel fuel using molecularly imprinted polymers that it does not significantly reduce the hydro-carbon content of the gasoline or diesel fuel.

Still yet another further important object of the invention is to provide a method for removing nitrogen compounds from gasoline or diesel fuel using molecularly imprinted polymers that is effective for commercial refinery use.

Still one further object of the invention is to provide a reusable method for removing nitrogen compounds from gasoline or diesel fuel using molecularly imprinted polymers.

A continuing object of the invention is to provide a method for removing pyrrole (PY), indole (IL) and carbazole (CB) from gasoline or diesel fuel using molecularly imprinted polymers.

Briefly, a process in accordance with the principles of the present invention includes the formation of molecularly imprinted polymers (MIPS) that contain an imprint of a target nitrogen compound molecule using, preferably, co-methacrylate MIPS. The formation of the nitrogen compound imprinted molecular polymers are formed by exposing a polymer, in liquid form, to a concentration of nitrogen compound molecules, and then hardening the polymer by heating or irradiating it. The polymer is then ground to form beads which have a plurality of exposed binding sites for the nitrogen compounds. The beads are then washed using a preferred solution or solvent or proprietary method to remove the nitrogen compound molecules from the surface of the beads to provide cavities which function as exposed binding sites that correspond to a molecular imprint (i.e., the shape) of at least a portion of one of the target nitrogen compound molecules. Gasoline or diesel fuel that contains the nitrogen compounds is exposed to the washed beads. The nitrogen compound molecules find receptor sites to which they then adhere. Adherence of the nitrogen compound molecule to each of the binding sites occurs through a variety of well-known methods, such as electrostatic bonding, hydrogen bonding, and other forms of non-covalent bonding as well as other bonding approaches including sacrificial spacer, covalent bonding, and copper binding site approaches. The use of other known and emergent approaches to forming the molecularly imprinted polymers to increase efficacy are also anticipated. In another formulation the MIPS may be formed directly by irradiation into a film form to be used, after washing, as is without the need for grinding into beads.

DETAILED DESCRIPTION OF THE INVENTION

Figure 1:
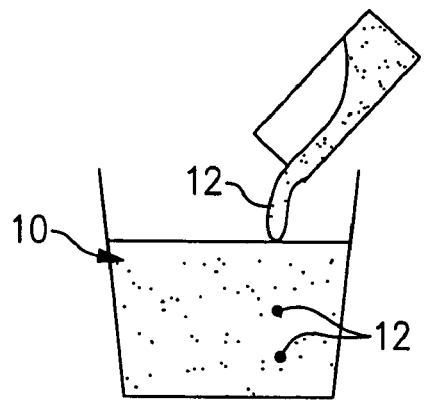
FIG. 1 is a side view of a co-methacrylate (polymer) solution at elevated temperature with PY, IL, and CB molecules being added thereto.

Referring on occasion to all of the FIGURE drawings and in particular to FIG. 1 is shown a polymer monomer in solution, hereinafter referred to as "the polymerization mixture" and identified in general by the reference numeral 10. The polymerization mixture 10 is also sometimes referred to as a "reaction mixture".

The polymerization mixture 10 includes nitrogen compound molecules, identified in general by the reference numeral 12, being added thereto and in solution throughout the polymerization mixture 10. The nitrogen compound molecules 12 are mixed or blended into the polymerization mixture 10 by stirring the polymerization mixture 10, as desired.

The polymerization mixture 10 contains methacrylic acid (functional monomer), ethyleneglycol dimethacrylate (cross linker), 2,2'-azo-bis-isobutyronitrile (polymerization initiator) and toluene (porogenic solvent). This is one possible formulation for making the polymerization mixture 10.

A preferred polymerization mixture 10 includes co-methacrylate.

The nitrogen compound molecules 12 that are added to the polymerization mixture 10 may contain some impurities, but the intent is to introduce a quantity of only the nitrogen compound molecules 12 at this time. Such an addition is sometime referred to as being "exogenous".

Preferred exemplary nitrogen compound molecules 12 are selected from a model group which includes: pyrrole (PY), indole (IL) and carbazole (CB) molecules.

However, it is important to understand that these particular nitrogen compounds (PY, IL, and CB) are in no way intended to limit the applicable scope of the invention. These particular nitrogen compounds are representative of the many other possible nitrogen compounds that are found in crude oil and therefore in gasoline and diesel fuels throughout the world. As mentioned above, the exact nitrogen compounds that will occur can vary considerably depending on the region of the world that the crude oil is from. These particular few nitrogen compounds are included herein by way of representative example only to teach the invention but not to limit the use or scope of the invention. Accordingly, the instant invention may be used to extract any desired nitrogen compound or combination of nitrogen compounds either serially (one after another) or in parallel (simultaneously extracting a plurality of possible nitrogen compounds), as desired.

Alternatively, other agents or chemicals may be added to the polymerization mixture 10 to aid, as desired, in the homogenization (i.e., the even dispersion) of the nitrogen compound molecules 12 throughout the polymerization mixture 10.

The nitrogen compound molecules 12 are, of course, too small to see individually in the FIG. 1 drawing and are shown only to indicate a concentration thereof as being formed and dispersed throughout the polymerization mixture 10.

At this time, a concentration of the target nitrogen compound molecules 12 are introduced to the polymerization mixture 10.

Figure 2:
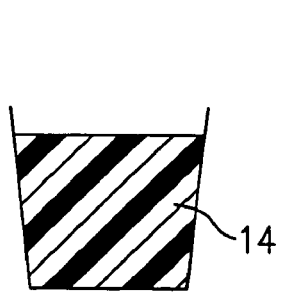
FIG. 2 is a side view of the solidified polymer containing the nitrogen compound molecules embedded in the polymer.

Referring now to FIG. 2, is shown a hardened polymer mass, identified in general by the reference numeral 14. The polymer mass 14 contains the concentration of the nitrogen compound molecules 12 dispersed throughout. (The individual nitrogen compound molecules 12 are not shown in the FIG. 2 drawing or in certain of the other FIG. drawings but they are present (at least to some small extent) in each of the FIG. drawings.

Each type of the nitrogen compound molecules 12 has a unique shape, and so they each form cavities or pockets throughout the polymer mass 14 that surrounds and contains them. As such, the polymer mass 14 is a formation of a molecularly imprinted polymer (MIP), that is imprinted to the nitrogen compound molecules 12 that they contain. A very large number of the nitrogen compound molecules 12 are contained in the polymer mass 14 (MIP).

There are at least three known ways to change the polymerization mixture 10 into a solid so as to form the polymer mass 14. The first is by irradiating the polymerization mixture 10 that is used with ultra-violet light so that it changes state from a liquid into a solid. This is a preferred method and is used with the formulation for the polymerization mixture 10 given hereinabove.

Alternative ways to form the polymer mass 14 are by heating and/or the addition of a chemical polymerization initiator that is mixed with the polymerization mixture 10, thereby changing it from a liquid state into a solid state.

While in solution (liquid state), the polymerization mixture 10 is said to contain monomers and when it is hardened into a solid it is referred to as a polymer or as referenced herein, the polymer mass 14.

The initiator, whichever is used, causes the monomers to link together and to form a solid. The monomers seek the tightest configuration possible as they solidify around the nitrogen compound molecules 12. As a result, the polymer mass 14 contains an innumerable quantity of the nitrogen compound molecules 12 that are each tightly surrounded by the polymer mass 14.

Processes to form the polymer mass 14 are well known in the plastic arts. However, an analogy to illustrate how the nitrogen compound molecules 12 are enclosed by the polymer mass 14, which is new, may be useful. The analogy has an irregularly shaped rock (not shown) suspended in water (not shown) while the water is cooled so as to form ice (not shown). The rock represents one of the target nitrogen compound molecules 12 and the water represents the polymerization mixture 10 (i.e., the monomers) and the ice represents the polymer mass 14.

As the water freezes, the ice forms an enclosure, or a cavity or a pocket, that surrounds the irregularly shaped rock. If the ice were cut in two around a maximum circumference of the rock and the rock was then removed from the cavity, the ice would reveal two pockets, each pocket being a very close match to the shape of the rock. The surface pattern and irregularity of the surface of the rock would correspond with that of each pocket.

No other rock would fit into the pocket as perfectly as would the rock that the ice surrounded. In fact, if the rock were correctly aligned and placed into either pocket, it would fit in there so well that it would naturally stay in place unless it was acted upon by some force to remove it.

Figure 3:
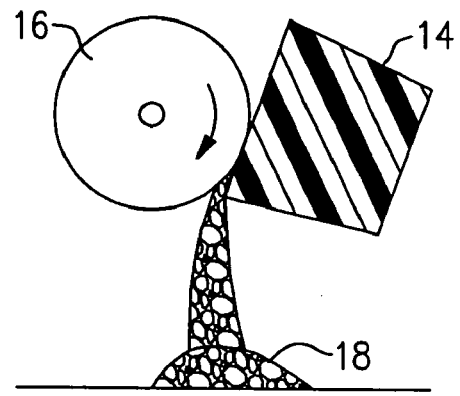
FIG. 3 is a side view of the solidified polymer being ground to form polymer beads.

Referring now to FIG. 3 is shown a grinding wheel 16 to which the polymer mass 14 is being applied and ground into a plurality of unwashed polymer beads, identified in general by the reference numeral 18. Each of the unwashed beads 18 contains innumerable nitrogen compound molecules 12, many of which are at the surface of the unwashed beads 18. Some of the nitrogen compound molecules 12 that were used to form the imprint are surrounded by and therefore contained within the unwashed beads 18. They remain therein and are of no consequence.

It is only the nitrogen compound molecules 12 that happen to be disposed on the surface of each of the unwashed beads 18 that are of consequence because they provide the locations for the nitrogen compound molecules 12 to later adhere to that are part of the gasoline or diesel fuel that is to have a portion of the nitrogen compound molecules 12 removed therefrom, as is described in greater detail hereinafter. But first, many of the nitrogen compound molecules 12 that are disposed on the surface of the unwashed beads 18 that were initially used to imprint the MIPS must be removed to make room for the nitrogen compound molecules 12 that are disposed in the gasoline or diesel fuel to bind, as is described in greater detail hereinafter.

The unwashed beads 18 form a plurality of molecularly imprinted polymers (MIPS) because they each contain (ideally) a great many imprints of the nitrogen compound molecules 12. Some of these imprints are on the surface and some, as mentioned hereinabove, are contained within the unwashed beads 18. The polymer mass 14 (MIP), after grinding, includes a plurality of smaller pieces that form the unwashed beads 18 (MIPS).

There are many ways for forming the unwashed beads 18 from the polymer mass 14 and include, for example, grinding, pulverizing, or fracturing the polymer mass 14 so as to produce the unwashed beads 18. The illustration of the grinding wheel 16 is intended to reveal a way, but by no means to limit their formation.

Depending upon the application, the polymer mass 14 may be ground to produce the unwashed beads 18 having any desired range of sizes (diameters). Obviously, the finer the unwashed beads 18 are, the greater will be the resultant surface area. The process of removing some of the nitrogen compound molecules 12 from the gasoline or diesel fuel is described in greater detail hereinafter, however for now it is sufficient to note that a greater surface area translates into more opportunities to capture the nitrogen compound molecules 12 simply because there are more receptor sites available, as is also discussed in greater detail hereinafter.

Therefore, a smaller (finer) granulation of the unwashed beads 18 will, generally, improve the efficacy of the removal process.

However, there are situations where a larger diameter or coarser size for the unwashed beads 18 is desirable, such as to improve the containment of them (or of the washed beads 22, as is described in greater detail hereinafter). After the unwashed beads 18 have been cleaned, they are herein referred to as "washed beads" and are identified by the reference numeral 22.

Commercial applications that reuse the washed beads 22 may benefit from a coarser type of the unwashed and the washed beads 18, 22. A coarser variety likely will be more durable for repeated use (repeated use is described in greater detail hereinafter) or, as mentioned hereinabove, they may be more easily contained. Containment of the washed beads 22 during use is described in greater detail hereinafter.

If coarser types of the washed beads 22 are used and it is desirable to increase the efficacy of the nitrogen compound removal process, then either more of the coarser variety of the washed beads 22 may be used or the length of time of exposure of a quantity of gasoline or diesel fuel 30 to the washed beads 22 may be increased, or both, as are described in greater detail hereinafter.

Not to serve as a limitation, but rather to indicate a possible size for the unwashed or the washed beads 18, 22, a diameter thereof of approximately 70 microns is anticipated. Larger and smaller diameters of the unwashed beads 18 and the washed beads 22 are certainly anticipated and are determined by the application at hand and by the economics to produce the unwashed and washed beads 18 22, as well.

Figure 4:
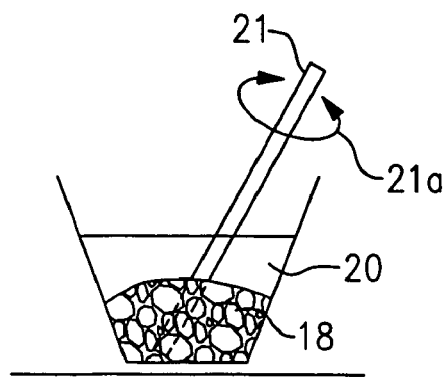
FIG. 4 is a side view of the polymer beads being washed to remove the nitrogen compound molecules from the surface thereof.

Referring now to FIG. 4, the unwashed beads 18 are in a cleaning solution 20, in which they are stirred and agitated, sufficient to remove a sufficient quantity of the nitrogen compound molecules 12 therefrom that are bound to the receptors on the surface of the unwashed beads 18. This step is the washing (or cleaning) of the unwashed beads 18 to remove the nitrogen compound molecules 12 on the surface thereof that were initially added to and mixed with the polymerization mixture 10.

Any of the terms (singular or plural) "receptors", "sites", "surface sites", "receptor sites", "binding sites", "cavities", "imprints", "surface imprints", or "nitrogen compound receptors" as used, are interchangeable and refer to any of a plurality of locations on the surface of the unwashed beads 18 and the washed beads 22 to which any of the target nitrogen compound molecules 12 may adhere (bind).

It is important to note that the receptor sites are each adapted to bind an individual PY, IL, or CB molecule. A high degree of specificity is important to ensure that non-target molecules are not retained by the MIPS.

The cleaning process is repeated as often as necessary and by using whatever is the preferred method or material to form the cleaning solution 20 until the surface of the unwashed beads 18 have been adequately cleaned (i.e., a sufficient amount of the nitrogen compound molecules 12 have been removed).

For example, simply washing with hot soapy water is possible and may provide acceptable results (i.e., a sufficient amount of nitrogen compound molecules 12 being removed) for certain applications.

Alternately, other proprietary methods are used to optimally remove the nitrogen compound molecules 12 from the surface of the unwashed beads 18 sufficient to produce the washed beads 22. These proprietary methods may become the subject matter of a subsequent patent application(s).

As is described in greater detail hereinafter, after the unwashed beads 18 have been washed they are referred to as "washed beads 22".

Referring again in particular to FIG. 4, a rod 21 is shown in contact with the unwashed beads 18 in the cleaning solution 20. The rod 21 is being stirred, as indicated by arrow 21a. The use of the rod 21 (or other mechanical means) to stir the unwashed beads 18 is well known in the cleaning arts, generally, and produces a more effective cleaning (washing) action as a result of a mechanical motion being imparted to the unwashed beads 18 while they are exposed to the cleaning solution 20.

The rod 21 and stirring action 21a can be omitted, if desired. Of course, the use of other types of devices (not shown) to further agitate the unwashed beads 18 are anticipated so as to more effectively wash them. For example, a simple shaking of the unwashed beads 18 and the cleaning solution 20 can be used. This shaking can be at any desired frequency including any of the higher frequencies that are associated with cleaning items in solution. These higher frequencies are sometimes referred to as "ultrasound", being of a frequency that resides above the auditory range of most people.

What is important is to utilize all available technologies to economically, quickly, and safely clean the unwashed beads 18. Cleaning the unwashed beads 18 means treating them in a manner that removes a sufficient amount of the nitrogen compound molecules 12, therefrom.

To continue the rock and ice analogy from hereinabove, the step of grinding the polymer mass 14 and the step of washing (i.e., cleaning) the unwashed beads 18 would be the fracturing of the ice so as to permit the removal of the rock from the surface of the ice.

Figure 5:
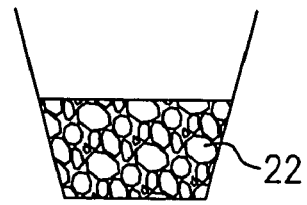
FIG. 5 is a side view of the washed and dried polymer beads.

Referring now to FIG. 5, after sufficient exposure to the cleaning solution 20 has occurred, the result yields a quantity of the washed beads 22, as shown. The washed beads 22 are the unwashed beads 18 that have been cleaned so as to have had a sufficient proportion of the nitrogen compound molecules 12 removed from the surfaces thereof. Certain of the nitrogen compound molecules 12 (from the original added concentration of the nitrogen compound molecules 12) will remain, as mentioned hereinabove, inside of the various washed beads 22, however they are not of concern in that they are each surrounded by parts of the polymer mass 14, and are, therefore, contained.

The washed beads 22 are dried, if desired, by any manner that is preferred. Air drying is possible and the washed beads 22 are stored until use.

The washed beads 22 include many cavities which function as specific binding (i.e., receptor) sites for the nitrogen compound molecules 12 at the surface thereof and which correspond with at least a portion of the molecular shape of one of the target nitrogen compound molecules 12 (i.e., PY, IL, or CB).

These cavities, which as mentioned hereinabove are also referred to as surface sites, receptor or receptive sites, binding sites, etc., are the shapes that remain after the nitrogen compound molecules 12 (from the concentrated mixture) have been removed from the surfaces of the washed beads 22. They are the spaces that remain on the surface of the washed beads 22 from where the nitrogen compound molecules 12 have been removed and their function is discussed in greater detail hereinafter.

Figure 6:
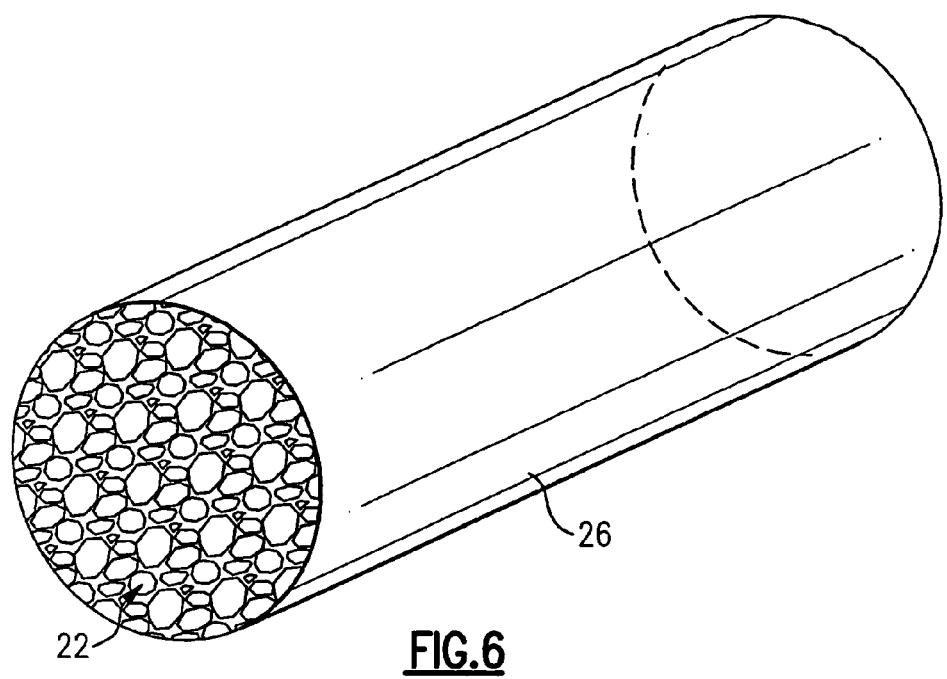
FIG. 6 is a view in perspective of the washed and dried polymer beads coated along the inside surface of a conduit.

Referring now to FIG. 6, a predetermined quantity (the magnitude of which depends upon the intended application) of the washed beads 22 are adhered to the inside surface of a conduit 26. The washed beads 22 are coated to the inside of the conduit 26 to which they adhere by the use of an adhesive or any other preferred method of attachment.

Figure 7:
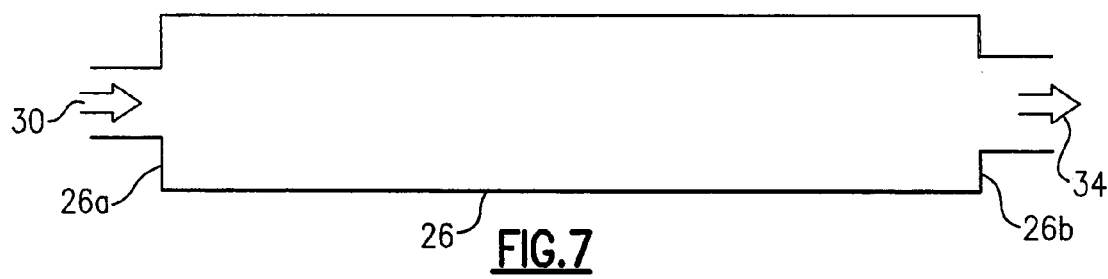
FIG. 7 is a cross-sectional side view of the conduit of FIG. 6 with a non-aqueous (i.e., organic) solution of either gasoline or diesel fuel flowing through the conduit.

Referring now to FIG. 7, the conduit 26 has a first end 26a through which the quantity of gasoline or diesel fuel 30 is pumped into the conduit 26. The gasoline or diesel fuel 30 enters in from the first end 26a although the process would be as effective if the direction of flow were reversed.

The gasoline or diesel fuel 30 contains an abundance of the nitrogen compound molecules 12 that enters into the first end 26a of the conduit 26, passes through the conduit 26, and exits from an opposite second end 26b thereof after having had some of the nitrogen compound molecules 12 removed therefrom.

As is described in greater detail hereinafter, a remediated gasoline or diesel fuel 34 is what exits from the second end 26b of the conduit 26. The gasoline or diesel fuel 30 becomes the remediated gasoline or diesel fuel 34 after having had some of the nitrogen compound molecules 12 removed therefrom.

The process of removing nitrogen compounds from the gasoline or diesel fuel 30 may also sometimes referred as "sweetening" the gasoline or diesel fuel 30. Accordingly, the remediated gasoline or diesel fuel 34 may be referred to as a "sweetened gasoline" or as a "sweetened diesel" fuel.

Other methods of containing the washed beads 22, such as in a container are anticipated, and of simply allowing the gasoline or diesel fuel 30 to flow through the container and of contacting the washed beads 22 sufficient to remove some of the nitrogen compound molecules 12. The gasoline or diesel fuel 30 could be allowed to remain in contact with the washed beads 22 for a sufficient period of time or, alternately, stirred or agitated while contact occurred, as desired.

Rapid removal of the target nitrogen compound molecules 12 (PY, IL, CB) occurs quickly when the gasoline or diesel fuel 30 is placed in contact with the washed beads 22 that are formed of co-methacrylate. A significant increase in efficacy at removing the nitrogen compound molecules 12 from the gasoline or diesel fuel 30 is found to occur as compared to the use vinyl-based polymers (MIPS), thereby producing an unexpected benefit. However, the use of any desired type of polymer is anticipated.

The gasoline or diesel fuel 30 flows through the conduit 26 where it commingles with the washed beads 22 that are disposed therein.

A portion of the nitrogen compound molecules 12 that are dispersed in the gasoline or diesel fuel 30 are deposited in and adhere to the receptor (surface) sites of the washed beads 22, thereby capturing some of the nitrogen compound molecules 12 and effectively removing them from the gasoline or diesel fuel 30.

To continue the ice and rock analogy, it is as if water (which represents the gasoline or diesel fuel 30) containing the rock (which represents the nitrogen compound molecules 12) was poured over the ice. To further the analogy, the water would contain many identically shaped rocks (and possibly other differently shaped rocks) and the ice would contain many identically shaped cavities that correspond to the shape of at least a portion of each of the identically shaped rocks.

Eventually, portions of some of the identically shaped rocks would pass over and properly align with certain of the correspondingly shaped portions on some of the cavities, into which the identically shaped rocks would be deposited and, accordingly, adhere. As the identically shaped rocks are deposited in certain of the cavities, they become captured and are effectively removed from the flow of the water. The differently shaped rocks (which represent non-target molecules) do not find matching cavities, are not deposited, and therefore are not removed from the water.

So it is also the situation with the targeted nitrogen compound molecules 12 in the gasoline or diesel fuel 30 in that they too are deposited into the receptor sites and are removed from the gasoline or diesel fuel 30. The differently shaped rocks, from the analogy, would correspond with the various other molecules in the gasoline or diesel fuel 30 that are not targeted by the receptor sites (i.e. the cavities), are not deposited, and therefore are not removed from the gasoline or diesel fuel 30.

Accordingly, a method to specifically target the desired nitrogen compound molecules 12 for removal from the gasoline or diesel fuel 30 is provided.

Continuing the analogy, the remaining water will have had a certain number of the "identically shaped rocks" removed by this process. With regard to the target rock, namely those which are identically shaped, the final supply of water will have been "de-rocked", for lack of a better word.

Similarly, referring again to FIG. 7, the gasoline or diesel fuel 30 will have had a certain number of the nitrogen compound molecules 12 removed therefrom. The process of removing a portion of the nitrogen compound molecules 12 from a substance can generally be referred to in the art as "remediation", and the resultant product is said to be "remediated" or "sweetened" and is herein referred to as a "remediated solution 34" that has exited from the second end 26b of the conduit 26.

By varying the length of the conduit 26, the rate of flow of the gasoline or diesel fuel 30 therein, and other factors such as the size of the washed beads 22 or the temperature of the gasoline or diesel fuel 30, the efficacy of the process can be varied.

By increasing the time the gasoline or diesel fuel 30 is exposed to the washed beads 22, the likelihood that more of the nitrogen compound molecules 12 therein will find adherence with the receptor sites (cavities) on the washed beads 22 is also increased.

Of course, another way to regulate the efficacy of the process is by increasing or decreasing the number of washed beads 22 that the gasoline or diesel fuel 30 is exposed to. More washed beads 22 for the solution 30 to pass by provides more sites to capture the various target nitrogen compound molecules 12 and therefore more opportunities to remove more of the nitrogen compound molecules 12 from the gasoline or diesel fuel 30. Conversely, less washed beads 22 will provide less binding sites and less removal. Accordingly, another method to regulate the efficacy of the remediation process is provided by varying the quantity of the washed beads 22 to which the gasoline or diesel fuel 30 is exposed.

Also, by varying the density of the nitrogen compound molecules 12 in the polymer mass 14, it is possible to influence the resultant number of receptor sites on the washed beads 22. More nitrogen compound molecules 12 results in an increased density of receptor sites on the unwashed and washed beads 18, 22 and a corresponding increase in efficacy of the remediation process. Correspondingly, less nitrogen compound molecules 12 being present when the polymer mass 14 is being formed will result in fewer binding sites and fewer of the nitrogen compound molecules 12 being removed from the gasoline or diesel fuel 30. Accordingly, another method to regulate the relative number of the nitrogen compound molecules 12 that remain in the remediated solution 34 is provided.

Still another way to regulate the efficacy is to control the quantity of the gasoline or diesel fuel 30 that will be exposed to the washed beads 22. If a small quantity of gasoline or diesel fuel 30 is exposed to the washed beads 22, then ample receptor sites will be available in the washed beads 22 for capture of the target nitrogen compound molecules 12.

If a larger quantity of the gasoline or diesel fuel 30 is exposed to the washed beads 22, then certain of the receptor sites will contain the nitrogen compound molecules 12 that have been deposited therein from an earlier extraction from the gasoline or diesel fuel 30 thereby preventing the capturing of additional quantities of the nitrogen compound molecules 12 in those "already filled sites", thereby reducing the efficacy of the process.

By varying the rate of flow of the gasoline or diesel fuel 30 through the conduit 26 the quantity of gasoline or diesel fuel 30 that is exposed is controlled.

Other methods to regulate the efficacy of the remediation process are also anticipated. For example, varying the temperature of the gasoline or diesel fuel 30 may be useful in influencing the ease by which the nitrogen compound molecules 12 either find or remain adhered to the receptor sites on the washed beads 22.

Regulating the number of the washed beads 22 may be combined with regulating the time of exposure of the gasoline or diesel fuel 30 to the washed beads 22, as desired, to further determine the efficacy of the process, as may the quantity of gasoline or diesel fuel 30 also be regulated in combination with any other influencing factor.

The remediation process is accomplished to the degree of efficacy as the limits of the process determine in conjunction with the objectives for remediation. For example, if it is desired to have 20-30% of the nitrogen compound molecules 12 removed from the gasoline or diesel fuel 30, the process is regulated to ensure that the remediated gasoline or diesel fuel 34 falls within that range. If it is desirable to have a greater percentage of the nitrogen compound molecules 12 removed, the efficacy of the process is regulated by any preferred means to attain the desired degree of remediation.

There is no limit inherent with this process that would prevent achieving any desired remediation efficacy approaching the limit of 100% removal of the nitrogen compound molecules 12 from the solution 30. Of course, no process is perfect and therefore it is unrealistic to imagine that all of the nitrogen compound molecules 12 can be removed. Accordingly, 100% is not a practical efficacy to attain with this or any other known process for nitrogen compound remediation or "sweetening".

After a predetermined quantity of the washed beads 22 have been exposed to a predetermined quantity of the solution 30, it can be assumed that the efficacy of the process will diminish, as many of the sites for binding become filled with the nitrogen compound molecules 12 thereby rendering progressively fewer open (available) receptor sites.

Either a new stock (supply) of washed beads (not shown) in a new conduit (not shown) would then be utilized or the previously used quantity of the washed beads 22 that have subsequently become saturated (to some extent) in the conduit 26 with the nitrogen compound molecules 12 would again be cleaned and then reused.

There are many ways of cleaning the conduit 26 and one of them includes exposing the washed beads 22 in the conduit 26 with a proprietary cleaning solution that is allowed to flow therein. Cleaning is important in that it allows for economical reuse of the washed beads 22, whether they are disposed in the conduit 26 or not.

The direction of flow may be as shown for the gasoline or diesel fuel 30 or it may be reversed (such as in a reverse-flush cleaning operation). Drying of the repeatedly washed beads 22 in the conduit 26 prior to reuse is preferred. After a predetermined period of time of exposure to a new quantity of gasoline or diesel (not shown) the washed beads 22 will again become saturated with the nitrogen molecules 12 and will again require cleaning (washing). This process is repeated for the life of the conduit 26 or of the washed beads 22, which is expected to be substantial.

To improve efficacy, it is of course possible to provide a plurality of parallel conduits (not shown) utilizing some or all of them at the same time. Additional clean conduits (not shown) may be substituted for saturated ones that are being cleaned to maintain a nearly constant rate of remediation.

The number of wash cycles that the conduit 26 and the washed beads 22 may be subjected to is a function of the type of material used to form the conduit 26 as well as the durability of the washed beads 22.

Figure 8:
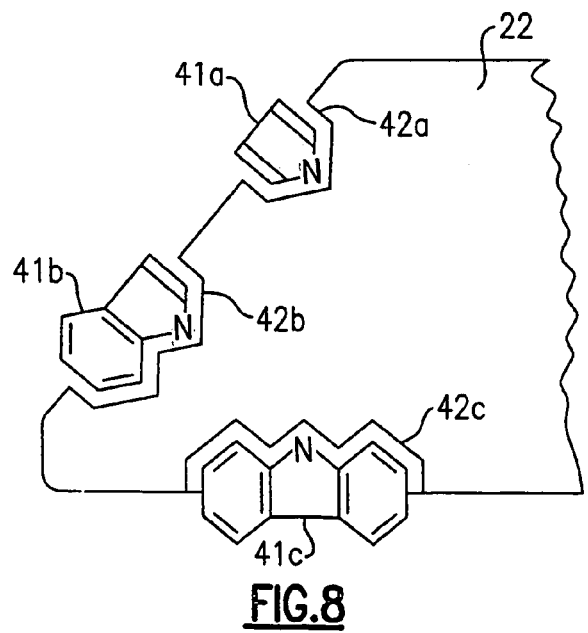
FIG. 8 is a pictorial view of a receptor site cooperating with a portion of a pyrrole (PY), indole (IL) and carbazole (CB) molecule sufficient to remove each from gasoline or diesel fuel.

Referring now to FIG. 8 is shown pictorially, one each of the target nitrogen compound molecules 12 (i.e., pyrrole (PY), indole (IL) and carbazole (CB)) in the gasoline or diesel fuel 30 that is flowing through the conduit 26. A PY molecule 41a, an IL molecule 41b, and a CB molecule 41c are each representative of the target nitrogen compound molecules 12 that have each been captured by a corresponding receptor site 42a, 42b, and 42c respectively that are disposed on the surface of one of the washed beads 22 (only a partial view of the washed bead 22 is shown).

There are many such receptor sites 42a, 42b, 42c on each of the washed beads 22 that are used to line the inside surface of the conduit 26. The target PY molecule 41a, IL molecule 41b, and CB molecule 41c of the nitrogen compound molecules 12 as shown, therefore, have each been removed from the gasoline or diesel fuel 30, thereby helping to change the gasoline or diesel fuel 30 into the "sweetened" or remediated solution 34.

The receptor sites 42a, 42b, 42c each correspond with but a portion of the shape of the corresponding target nitrogen compound molecule 12, yet that is sufficient to retain the target nitrogen compound molecule 12 in place and remove it from the gasoline or diesel fuel 30.

There does not have to be an equal number of receptor sites 42a, 42b, 42c for the three target molecules (PY, IL, and CB). If the gasoline or diesel fuel 30 is expected to contain a preponderance of the PY molecules 41a, the IL molecules 41b, or the CB molecules 41c, the polymerization mixture 10 is adjusted accordingly to produce MIPS (i.e., washed beads 22) with a preponderance of the most likely nitrogen compound molecule, or molecules 12.

Continuing the rock and ice analogy from before, the shape of each type of the nitrogen compound molecule 12 is unique as is the shape of the identically shaped rock (or identically shaped rocks) that were used in the analogy.

The process can also be compared to an attempt to open a lock with a key. The match between lock and key is highly specific and only the assigned key will open the door. With molecular imprinting only the correctly shaped molecules will fit into the physical "key holes" (i.e., a corresponding one of the receptor sites 42a, 42b, 42c) that are provided in the washed beads 22.

Certain of these forces that retain the nitrogen compound molecules 12 in a position of cooperation proximate the receptor sites of the washed bead 22 include hydrogen bonding, electrostatic bonding, and non-specific non-covalent bonding. As is well known in the chemical arts, various means may be employed to vary the influence of these forces, as desired.

When the grinding operation occurs so as to produce the unwashed beads 18, they may produce various matching profiles. Therefore, the actual physical and chemical profile of the sites will vary from site to site, but in general the shape of all of those sites that are targeted for each nitrogen compound molecule 12 will correspond with at least some portion of the shape of that particular nitrogen compound molecule 12.

Of course, due to imperfections in the process and impurities, other trace molecular sites will also occur in the unwashed beads 18, however their frequency will be low and insignificant. These imperfections are responsible for removal of other substances in trace amounts from the gasoline or diesel fuel 30.

It is also possible that some of the receptor sites 42a, 42b, 42c that do contain an imprint of the target nitrogen compound molecule 12 will, on occasion, inadvertently remove a molecule (not shown) other than the target nitrogen compound molecule 12, however, this again is of such a low probability of occurrence so as to be statistically insignificant.

Related testing has included the introduction of a preponderance of molecules (not shown) that are close in shape to that of the target nitrogen compound molecules 12 and it has been demonstrated that that the untargeted molecules are not excessively removed from the gasoline or diesel fuel 30. This helps to ensure that the sweetened or remediated gasoline or diesel fuel 34 retains its hydro-carbon content and, accordingly, preserves its high octane rating.

When this process of contact by the gasoline or diesel fuel 30 with the sites in the conduit 26 is repeated countless millions of times, a substantial amount of the nitrogen compound molecules 12 that were part of the gasoline or diesel 30 will have been extracted from the gasoline or diesel 30 thereby creating the sweetened, remediated gasoline or diesel 34. As a result of mere contact by the gasoline or diesel 30 with the washed beads 22, the gasoline or diesel 30 loses some of the targeted nitrogen compound molecules 12 it originally contained and, as such, is transformed into the remediated gasoline or diesel 34.

Accordingly, the disclosed process for remediating the gasoline or diesel 30 is inert in that no active chemicals or ingredients are needed to remove the nitrogen compound molecules 12 from the gasoline or diesel 30.

The remediated gasoline or diesel fuel 34 is ready for use as a motor fuel oil.

It is also noted that the washed beads 22, once exposed to a sufficient quantity of the gasoline or diesel 30, eventually become, as mentioned hereinabove, saturated with the target nitrogen compound molecules 12. As also mentioned hereinabove, they may then be treated (i.e., cleaned or washed) to remove a portion of the nitrogen compound molecules 12, and then reused.

It is also important to note that when the saturated washed beads 12 are being cleaned, the nitrogen compound molecules 12 may be collected in concentrate and used for other purposes, as may subsequently arise or as may be desired.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

For example, if the conduit 26 were not used, then the washed beads 22 (a sufficiently large quantity) would be placed into a container that included openings that were smaller than the washed beads 22 (so they wouldn't fall out) yet large enough to let the gasoline or diesel fuel 30 flow past the washed beads 22 and become the remediated solution 34 when it exited therefrom.

In particular, another preferred approach to exposing the gasoline or diesel fuel 30 to the washed beads 22 includes a "stop-flow" type of system. For a stop-flow system, a container or vat is provided to contain a sufficient quantity of the washed beads 22. A sufficient quantity of the gasoline or diesel fuel 30 is allowed to flow into the container or vat and to mingle with the washed beads 22 therein. At this time the flow into the container or vat is stopped. Ideally, a mechanical device is provided to gently stir the washed beads 22 for a period of time sufficient to render the gasoline or diesel fuel 30 as the remediated solution 34. Then the flow is resumed and the remediated solution 34 is allowed to flow (or pumped) from the container or vat for future use, as desired.

Depending on many factors that affect the washed beads 22, it may be possible to continue to use the same washed beads 22 for an additional period of time. If any drop in efficacy is expected or noted, the duration of exposure of the gasoline or diesel fuel 30 in the container or vat can be increased to compensate accordingly in order to provide the remediated solution 34.

Eventually, the washed beads 22 in the container or vat will become saturated with the nitrogen compounds that are being extracted from the gasoline or diesel fuel 30 and will require removal and replacement with a fresh supply of the washed beads 22. It is expected that the removed and saturated washed beads 22 will themselves be treated and cleaned to prepare them for future reuse.

Other changes are similarly possible to those having had benefit of the instant disclosure. For example, the method and product as described herein can be modified, as desired, by using silicon-based imprinted polymers or SIPS (instead of MIPS)

What is claimed is:

1. A process for removing at least one nitrogen compound molecule from gasoline or diesel fuel, which comprises the steps of:
   (a) exposing said gasoline or diesel fuel to an inert material adapted to remove a portion of the nitrogen compound therefrom wherein said inert material includes a molecularly imprinted polymer, said molecularly imprinted polymer having at least one site imprinted thereon; and
   (b) wherein the step of exposing includes the step of contacting said gasoline or diesel fuel with said inert material, said at least one site imprinted on the surface thereof of said inert material being adapted to cooperate with said nitrogen compound by extracting said at least one nitrogen compound molecule from said gasoline or diesel fuel.

2. A process for removing at least some nitrogen compound molecules from gasoline or diesel fuel, which comprises the steps of:
   contacting said gasoline or diesel fuel with at least one molecularly imprinted polymer, said molecularly imprinted polymer having at least one site imprinted on the surface thereof that is adapted to cooperate with said nitrogen compound by extracting at least one nitrogen compound molecule from said gasoline or diesel fuel.

3. A process for removing at least one nitrogen compound molecule from gasoline or diesel fuel, which comprises the steps of:
   contacting said gasoline or diesel fuel with at least one molecularly imprinted polymer, said molecularly imprinted polymer having at least one site imprinted on the surface thereof that is adapted to cooperate with at least a portion of said nitrogen compound molecule.

4. The process of claim 3 wherein the step of contacting said gasoline or diesel fuel includes contacting said gasoline or diesel fuel with at least one molecularly imprinted polymer, said molecularly imprinted polymer having at least one site imprinted on the surface thereof that is adapted to cooperate with at least a portion of said nitrogen compound molecule by extracting said nitrogen compound molecule from said gasoline or diesel fuel.

5. A process for removing at least one nitrogen compound molecule from gasoline or diesel fuel, which comprises the steps of:
   exposing said gasoline or diesel fuel to at least one molecularly imprinted polymer, said molecularly imprinted polymer having at least one site on a surface thereof that is adapted to receive at least a portion of said nitrogen compound molecule.

6. The process of claim 5 wherein the step of exposing includes exposing said gasoline or diesel fuel to said molecularly imprinted polymer wherein said molecularly imprinted polymer includes means for retaining said nitrogen compound molecule in proximity to said at least one site.

7. The process of claim 6 wherein said means for retaining includes non-covalent bonding.

8. The process of claim 6 wherein said means for retaining includes hydrogen bonding.

9. The process of claim 5 including the step of forming a plurality of molecularly imprinted polymer beads from said at least one molecularly imprinted polymer prior to the step of exposing said gasoline or diesel fuel thereto.

10. The process of claim 9 wherein the step of forming includes grinding said at least one molecularly imprinted polymer.

11. The process of claim 9 wherein the step of forming includes pulverizing said at least one molecularly imprinted polymer.

12. The process of claim 9 wherein the step of forming includes fracturing said at least one molecularly imprinted polymer.

13. The process of claim 9 including the step of treating a surface of said plurality of molecularly imprinted polymer beads after the step of forming said plurality of molecularly imprinted polymer beads and prior to the step of exposing said gasoline or diesel fuel thereto.

14. The process of claim 13 wherein the step of treating a surface includes cleaning said surface of said plurality of molecularly imprinted polymer beads sufficient to remove a quantity of nitrogen compounds from said surface.

15. The process of claim 13 wherein the step of treating includes exposing a plurality of receptor sites in said surface, each of said receptor sites adapted to receive and retain a target nitrogen compound molecule.

16. The process of claim 13 wherein the step of treating includes exposing said plurality of molecularly imprinted polymer beads to a cleaning solution that is adapted to remove a sufficient quantity of nitrogen compound molecules from said surface.

17. The process of claim 9 including the step of removing at least a portion of said nitrogen compound molecules that were used to imprint said at least one molecularly imprinted polymer from the surface of said plurality of molecularly imprinted polymer beads after the step of forming said plurality of molecularly imprinted polymer beads and prior to the step of exposing said gasoline and diesel fuel thereto.

18. The process of claim 13 including the step of drying said plurality of molecularly imprinted polymer beads after the step of treating said molecularly imprinted polymer beads and prior to the step of exposing said gasoline or diesel fuel thereto.

19. The process of claim 13 including the step of reusing said plurality of molecularly imprinted polymer beads after the step of treating a surface of said plurality of molecularly imprinted polymer beads.

20. The process of claim 5 wherein said nitrogen compound includes a molecule selected from the group consisting of pyrrole, indole, and carbazole.

* * * * *